Feb. 6, 1968  J. P. CONNER ETAL  3,368,171
ELECTRIC CONTROL DEVICES WITH MECHANICAL INTERLOCK
Original Filed May 25, 1964  6 Sheets-Sheet 1

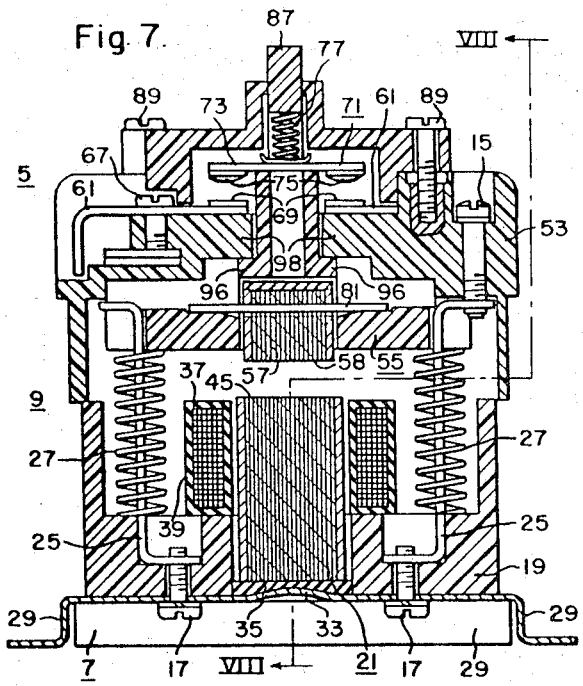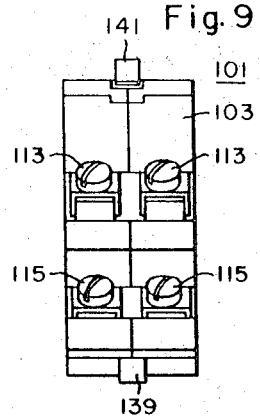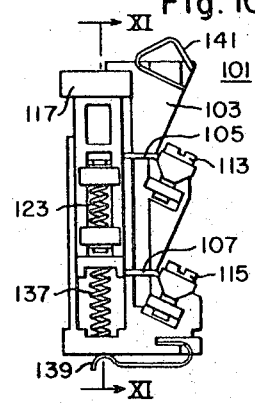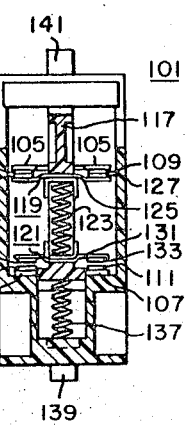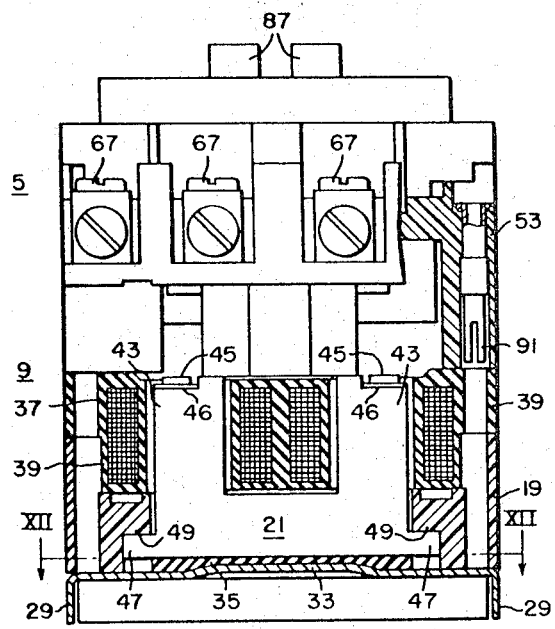

United States Patent Office 3,368,171
Patented Feb. 6, 1968

3,368,171
ELECTRIC CONTROL DEVICES WITH MECHANICAL INTERLOCK
John P. Conner and Kurt A. Grunert, Beaver, Pa., assignors to Westinghouse Electric Corporation, Pittsburgh, Pa., a corporation of Pennsylvania
Application Aug. 10, 1966, Ser. No. 571,582, now Patent No. 3,339,161, dated Aug. 29, 1967, which is a division of application Ser. No. 369,715, May 25, 1964, now Patent No. 3,296,567, dated Jan. 3, 1967. Divided and this application May 25, 1967, Ser. No. 641,230
9 Claims. (Cl. 335—120)

ABSTRACT OF THE DISCLOSURE

An improved contactor combination is provided comprising two similar contactors mounted in a side-by-side relationship with a mechanical interlock disposed in a common pocket formed by two adjacent cavities in the contactors, which interlock serves to limit the contactors to alternate operation.

Cross-references

This is a division of our application Ser. No. 571,582, filed Aug. 10, 1966, now Patent No. 3,339,161, which was a division of our parent application Ser. No. 369,715, filed May 25, 1964, now Patent No. 3,296,567.

Brief summary of the invention

The invention comprises a combination of two similar contactors mounted in a side-by-side relationship and a mechanical interlock disposed in a common pocket formed by means of two adjacent cavities in the contactors. The mechanical interlock serves to limit the contactors to alternate operation. A mechanical interlock can be mounted at either of two opposite sides of the mounted contactors in either of two pockets formed by adjacent cavities in the contactors. The contactors and mechanical interlock are so constructed that the mechanical interlock fits substantially within the confines of the associated pocket so that the combination does not require additional panelboard space. The mechanical interlock is automatically operatively connected to the contactors merely by means of the mounting operation.

The invention, both as to construction and operation, together with objects and advantages thereof, will be best understood from the following detailed description when read in conjunction with the accompanying drawings, in which:

FIG. 7 is a sectional view taken generally along the line VII—VII of FIG. 4;

FIG. 8 is a sectional view taken generally along the line VIII—VIII of FIG. 7;

FIG. 9 is a side elevational view of an auxiliary contact device;

FIG. 10 is a left side elevational view of the auxiliary contact device seen in FIG. 9;

FIG. 11 is a sectional view taken generally along the line XI—XI of FIG. 10;

Figure 1:
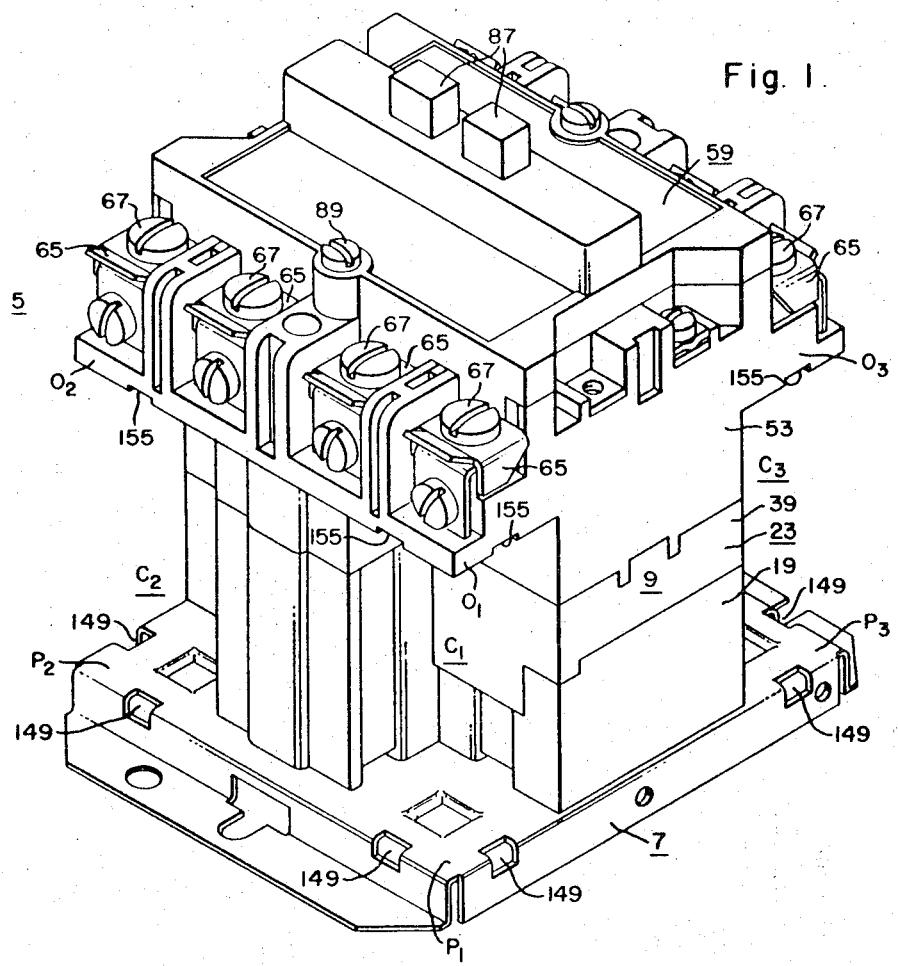
FIGURE 1 is a isometric view of an electric control device constructed in accordance with principles of this invention.

Referring to the drawings, there is shown in FIG. 1, an electric control device or contactor 5 comprising a metallic base plate 7 and a contactor structure 9. The contactor structure 9 comprises a back part 11 (FIG. 2B) and a front part 13 (FIG. 2A) which parts are connected together by means of two screws 15 (only one screw being shown in FIG. 2A). The contactor structure 9 is secured to the base plate 7 by means of two screws 17 (only one screw 17 being shown in FIG. 2B) which connect the back part 11 to the base plate 7 in a manner to be hereinafter specifically described.

Figure 2A:
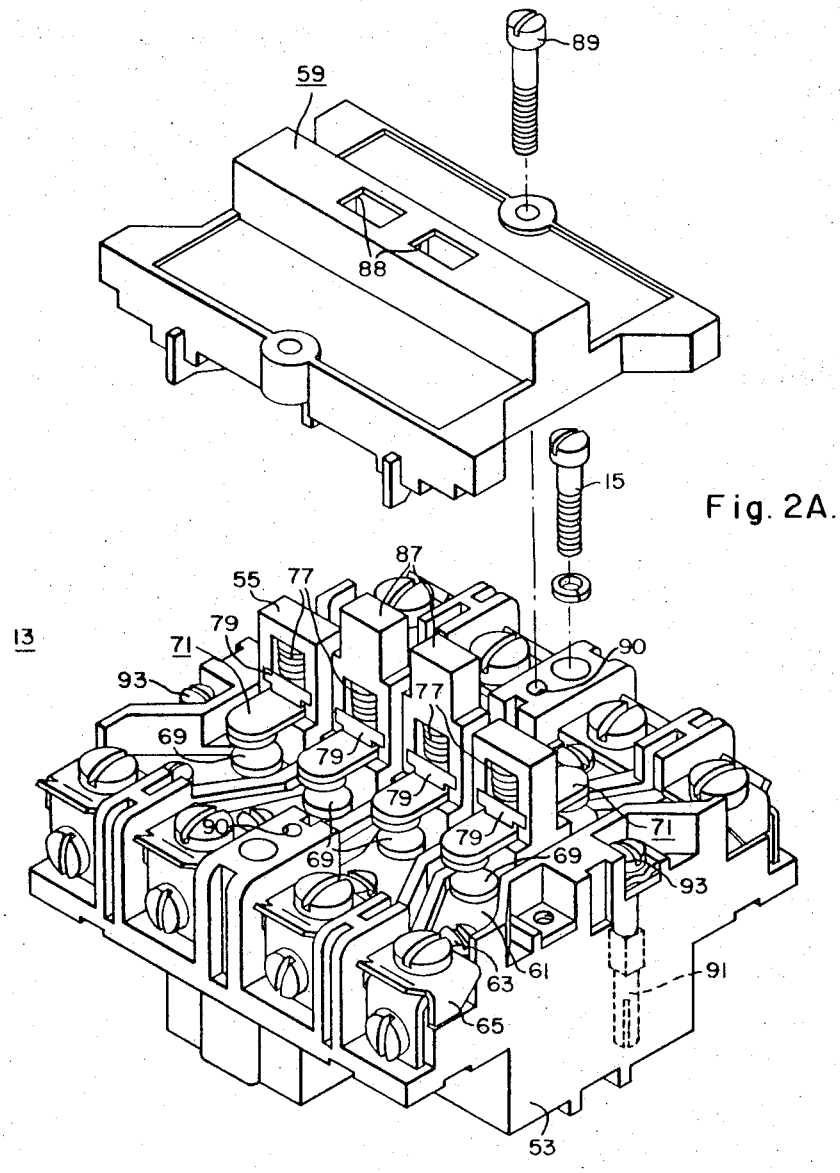
FIG. 2A is an exploded isometric view of the front part of the control device seen in FIG. 1.
Figure 2B:
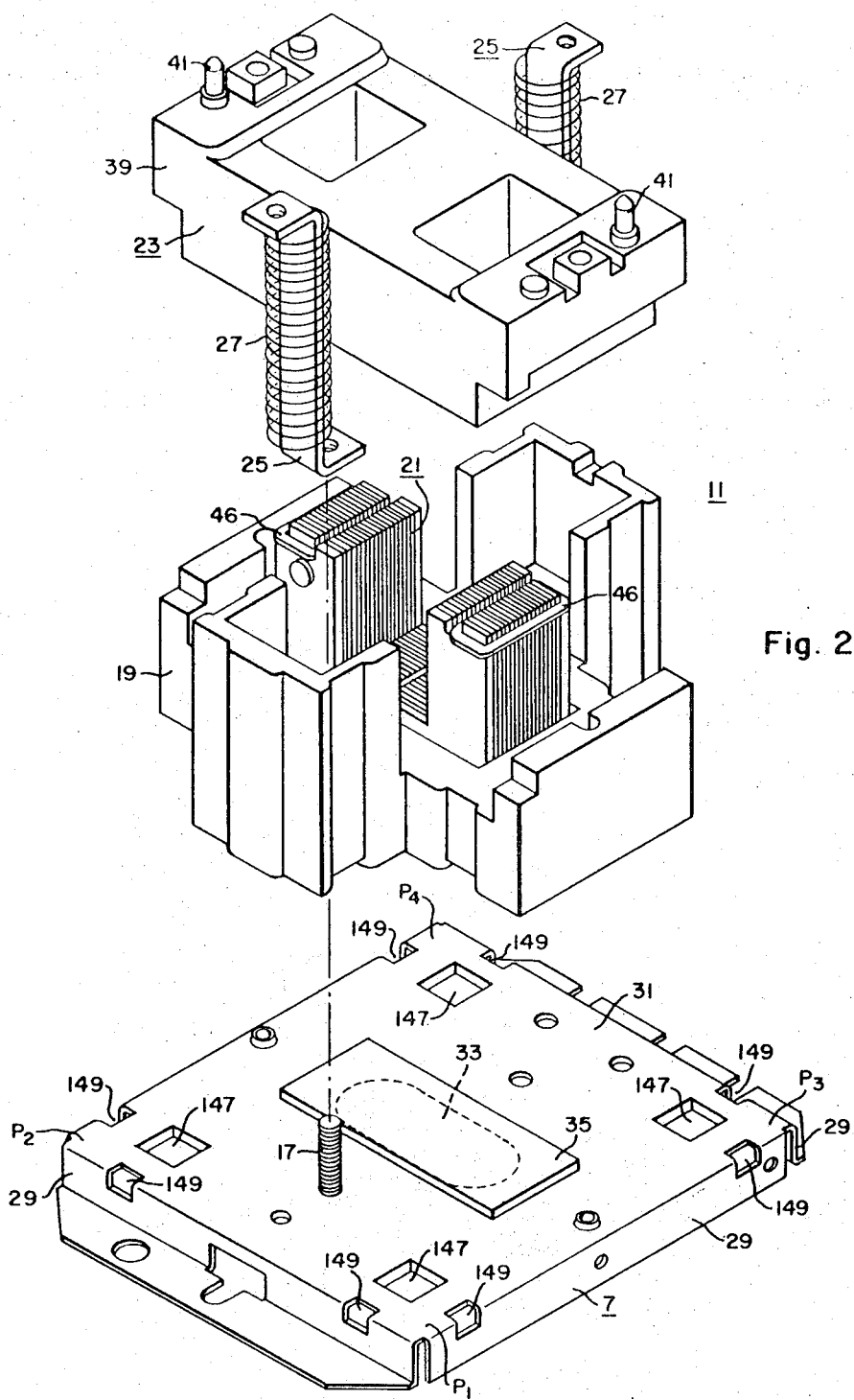
FIG. 2B is an exploded isometric view of the back part of the control device seen in FIG. 1.

As can be seen in FIG. 2B, the back part 11 of the contactor structure 9 comprises a back insulating housing part 19, a generally U-shaped magnetic core member 21, a coil structure 23, two generally Z-shaped supports 25 and two spring members 27 disposed over the supports 25.

As is best seen in FIGS. 2B, 7 and 8, the mounting plate 7 comprises a sheet metal plate member bent over at the four sides thereof to form four leg portions 29 that support the generally rectangular upper supporting plate part 31. The upper plate part 31 comprises a generally planar supporting surface having a hump 33 formed therein, which, as can be seen in FIGS. 7 and 8, is a generally convex surface that serves to support the core member 21 in a manner to be hereinafter specifically described. A shock-absorbing resilient elastomeric or rubber member 35 is disposed on the plate 7 over the hump 33. A member 35 comprising a neoprene rubber member has been successfully tested in a control device of the type herein described.

The coil structure 23 comprises a conducting coil 37 (FIGS. 7 and 8) encapsulated in an insulating shell 39. Two stab-type terminal conductors 41 (FIG. 2B) extend from the insulating shell 39 to enable connection of the insulating shell 39 to enable connection of the coil 37 in an electric circuit. As can be seen in FIGS. 2B, 7 and 8, the coil structure 23 has two openings therein which receive the two legs of the generally U-shaped magnetic core member 21. The magnetic core member 21 comprises a plurality of laminations forming two leg parts 43 (FIG. 8) that extend upward to provide two pole faces 45 having shading coils 46 supported therein. The core member 21 also comprisese two extensions 47 (FIG. 8). During assembly of the contactor 5, the shock absorbing pad 35 (FIG. 2B) is first placed on the supporting part 31 of the plate 7 just over the hump 33. The magnetic core member 21 is then set down on top of the pad 35. Thereafter, the insulating housing part 19 is placed down over the core 21 with the core protruding through an opening in the housing part 19 and with two ledges 49 (FIG. 8) being disposed just over the extensions 47 of the core 21. The Z-shaped supports 27 are then placed in position and the screws 17 are passed up from the bottom of the plate 7 through suitable openings in the insulating housing part 19 and threaded into tapped openings in the lower legs of the supports 25 in the manner disclosed in FIG. 7. Thus, the screws 17 draw the supports 25 and insulating housing part 19 toward the plate 7. This movement, because of the engagement of the ledges 49 (FIG. 8) of the housing part 19 with the extensions 47 of the core member 21, pulls the magnetic core member 21 against the resilient pad 35 to thereby mount the core 21 on the hump portion 33 of the plate 7.

Figure 3:
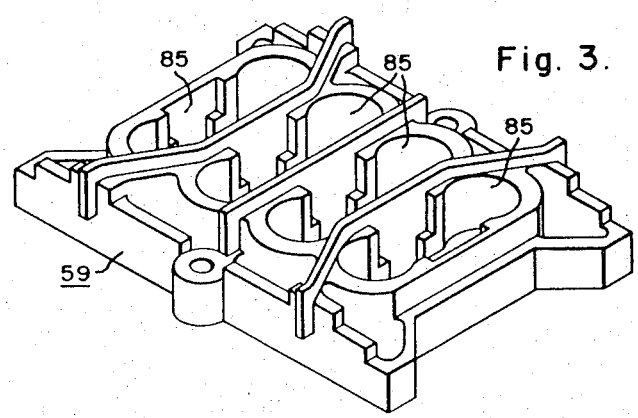
FIG. 3 is an isometric view of the arc-hood device seen in FIGS. 1 and 2A, with the device being turned over from the position in which it appears in FIGS. 1 and 2A.
Figure 4:
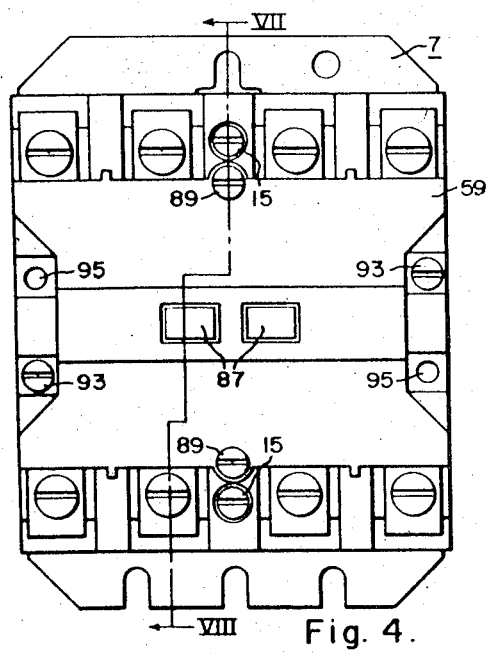
FIG. 4 is a top plan view of the control device seen in FIG. 1.
Figure 5:
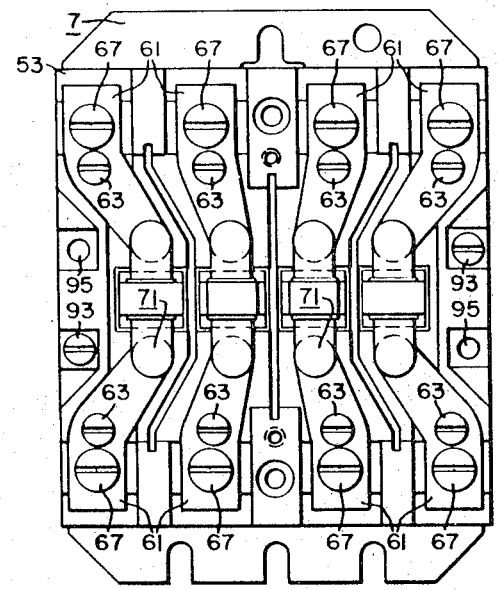
FIG. 5 is a plan view with the arc-hood removed, of the control device of FIG. 4.

Referring to FIGS. 1, 2A, 7 and 8, the top or front part 13 of the contactor structure 9 comprises an upper housing part 53 of molded insulating material, a molded insulating contact carrier 55, a generally U-shaped magnetic armature 57 and an insulating arc-hood device 59. The generally U-shaped armature 57 has a separate pole face 58 (FIG. 7) at the outer end of each of the two leg portions thereof. As is best seen in FIGS. 2A and 5, four pairs of conducting straps 61 are secured to the insulating housing top part 53 by means of screws 63. A separate terminal plate 65 (FIGS. 1 and 2A; not shown in FIGS. 4, 5 and 7 for the purpose of clarity) is connected to the outer end of each of the conducting straps 65 by means of a terminal screw 67. A stationary contact 69 (FIGS. 2A and 7) is brazed or otherwise suitably secured to the inner end of each of the conducting straps 61. A separate bridging contact member 71 is provided to bridge each pair of separated stationary contacts 69. As can be seen in FIG. 7, each of the bridging contact members 71 comprises a conductor 73 and two stationary contacts 75 secured to opposite ends of the conductor 73. As is best seen in FIG. 2A, the insulating contact carrier 55 has four window openings therein. Each of the bridging contact members 71 is supported on the contact carrier 55 in a separate one of the window openings. In each of the openings a separate compression spring 77 biases a spring support 79 against the associated bridging contact member 71 to retain the member 71 in place and to provide for resilient contact engagement. As can be seen in FIG. 7, the insulating contact carrier 55 has an opening therein and a generally U-shaped laminated magnetic armature 57 is supported in the opening on the contact carrier 55 by means of a supporting pin 81 that passes through a suitable opening in the bight portion of the U-shaped armature 57 and is supported on ledges on a surface of the insulating contact carrier 55. A generally resilient shock absorbing pad 82 is mounted between the armature 57 and contact carrier 55. During assembly of the upper or front part 13 of the contact structure 9, the insulating contact carrier 55 and the magnetic armature 57 are moved up through an opening from the bottom of the insulating housing part 53 and, thereafter, the bridging contact members 71 are mounted in position in the window openings of the contact carrier 55 to thereby secure the insulating contact carrier 55 and armature 57 along with the bridging contact members 71 in position on the upper housing part 53. As can be seen in FIG. 3, the arc-hood device is a molded insulating member having four arc chambers 85 formed therein to extinguish the arcs drawn between the separating contacts of the four poles of the contactor 5. The insulating contact carrier 55 is provided with two upper extensions 87 that protrude through two openings 89 (FIG. 2A) in the arc-hood device 59 to provide alignment of the contact carrier 55. The arc-hood device 59 is secured to the upper part 53 of the insulating housing by means of two screws 89 (FIGS. 1 and 2A) that are screwed into tapped openings 91 (FIG. 2A) in the upper housing part 53. The front or upper part 13 (FIG. 2A) is secured to the back or lower part 11 (FIG. 2B) of the contactor structure 9 by means of two screws 15, only one of which is shown in FIGS. 2A and 7. Each of the two screws 15 is threaded into an upper tapped opening in a different one of the two supports 25. The two screws 15 connect the top part (FIG. 2A) with the bottom part (11, FIG. 2B) of the contactor structure 9. The two springs 27 engage the contact carrier 55 at 90 (FIG. 6) to bias the contact carrier 55, armature 57, and bridging contact members 71 to the upper unattracted position seen in FIG. 7. Tubular conducting socket members 91 (FIGS. 2A, 6 and 8) are suitably supported at opposite sides of the insulating housing part 53 to cooperate with the two stab members 41 (FIG. 2B). A separate terminal screw 93 (FIG. 2A) is connected to each of the tubular socket members 91 to enable connection of the tubular sockets 91 in an electric circuit. When the top part 13 (FIG. 2A) is connected to the bottom part 11 (FIG. 2B), the two conducting stabs 41 that are electrically connected to the energizing coil 37 (FIG. 7) are forced into the openings of the tubular conducting sockets 91 to connect the terminal 93 to the coil 37 whereby when conductors (not shown) are connected to the terminals 93 the coil 37 will be connected in the electric circuit of the conductors.

As can be seen in FIG. 5, the contactor that is herein disclosed is a four-pole contactor with four separate controlled conducting paths extending lengthwise through the contactor. The contactor is herein described as having a length and width; but it is to be clearly understood that the word length is not necessarily limited to a dimension that is longer or as long as the width of the contactor. As can be seen in FIG. 5, the conductors 61 are shaped to provide that the plurality of conducting paths converge from each of the two opposite ends thereof toward the center to thereby provide additional space at each of the two opposite sides of the plurality of conducting paths for the terminals 93. Additional openings 95 are provided in the housing part 53 to receive additional conducting sockets 91 and terminal screws 93 when a dual voltage coil is utilized in the contactor. As is seen in FIGS. 1 and 2A, each of the four conducting paths is separated and electrically insulated from the adjacent paths by means of insulating barriers that are molded integral with the housing part 53.

With the provision of the conducting paths converging from the terminals toward the bridging contact members, the terminals can be separated to provide adequate electrical clearance between adjacent terminals and adjacent wires that would be connected to the terminals, and the contactor is still provided with four conducting paths across the top thereof along with room at each of the two opposite sides of the four conducting paths for the coil terminals 91, 93.

Although the relay contactor that is herein described provides four normally open contact positions, it can be understood that the shape and form of these contacts can be changed in order to provide normally closed operation in a manner that is well known in the contactor art. It is also to be understood that the contactor can be constructed with more or less than four poles.

Referring to FIG. 7, the contactor 5 is shown therein with the contact carrier and armature biased to the upper unattracted position by means of the springs 27. When the contact carrier 55 is in this position, the four bridging contact members 71 are in the upper position separated from the stationary contacts 69 so that the four poles of the contactor are normally opened. Upon energization of the coil 37, the armature 57 is pulled, against the bias of the springs 27, into engagement with the generally U-shaped magnetic core member 21. This movement is limited by engagement of the two pole faces 58 of the generally U-shaped armature 57 with the adjacent two pole faces 45 of the generally U-shaped core member 21. During this movement, the springs 27 are compressed and charged and the four bridging contact members 71 are moved down into engagement with the contacts 69 whereby each of the bridging contact members 71 closes a circuit between the associated stationary contacts 69. Each of the springs 77 is compressed slightly during the closing operation to provide contact pressure between the closed contacts. With the armature 57 in engagement with the magnet yoke 21, and with the contact carrier 55 in the lower position charging the springs 27, when the coil 37 is deenergized, the charged springs 27 will expand moving the insulating contact carrier 55 upward to the position seen in FIG. 7 to move the armature 57 and the four bridging contact members 71 upward to the unattracted position. This movement is limited by engagement of shoulder portions 96 (FIG. 7) on the insulating contact carrier with ledge portions 98 on the insulating housing part 53. The contactor can then be again operated in the same manner by energization of the coil 37.

During each closing operation of the contactor 5, the shock absorbing pads 35 and 82 reduce the shock of the impact between the armature 57 and core 21. The core 21, being disposed over the hump 33 of the mounting plate 7, can move universally to a limited extent in any direction to provide automatic alignment of the pole faces 45 of the core 21 with the pole faces 58 of the armature 57. This cushioning dampens shocks from armature impacts not only in its own contactor assembly but also in adjacent units to thereby reduce contact bounce and wear between the contacts and also between the pole faces of the magnet yoke and armature. The self-aligning feature comprising the core mounting means saves wear on the parts and it also contributes to provide for a quieter operation of the contactor. Moreover, with the provision of a metallic mounting plate 7 comprising a raised supporting part 31 and four feet 29, the raised supporting part 31 will flex slightly during each closing operation and some of the energy of the impact of the armature against the yoke will be absorbed due to internal strain energy in the mounting plate. Thus, the particular mounting arrangment of the magnet yoke 21 serves to aid in reducing: contact bounce and contact wear, magnet yoke-armature pole face wear, fatigue in the structural members, and the noise level of the operation of the contactor.

There is shown in FIGS. 9–11, three views of an electrical interlock or auxiliary contact device 101. The auxiliary contact device 101 comprises an insulating housing 103 having two upper conductors 105 supported therein and two lower conductors 107 supported therein. A separate stationary contact 109 (FIG. 11) is welded or otherwise secured to each of the conductors 105 and a separate stationary contact 111 is welded or otherwise suitably secured to the conductors 107. The conductors 105 extend out through openings at the side of the insulating housing 103 and a separate terminal screw 113 is supported at the outer end of each of these conductors to enable connection of the contacts 109 in an electric circuit. The conductors 107 extend out through the side of the insulating housing and a separate terminal screw 115 is provided at the outer end of each of these conductors to enable connection of the contacts 111 in an electric circuit. An insulating operating member and contact 117 is mounted for reciprocal rectilinear vertical movement in the insulating housing 103. The member 117 is provided with a window opening therein and two bridging contact members 119 and 121 are supported in the opening by means of a spring 123. The bridging member 119 comprises a conducting member 125 and two contacts 127 welded or otherwise secured to the opposite ends of the members 125. The bridging contact members 121 comprises a conductor 131 and two contacts 133 welded or otherwise secured to the opposite ends of the member 131. An operating spring 137 biases the member 117 and therefore the two bridging contact members 119 and 121 to the upper position shown in FIG. 11. A lower resilient spring steel clip member 139 is secured to the housing 103 and an upper resilient spring steel clip member 141 is secured to the upper part of the housing 103. The auxiliary contact device 101 is operated by depression of the member 117 which movement charges the operating spring 137. This downward (FIG. 11) movement of the member 117 moves the upper bridging contact member 119 from the normally closed to an open position. This movement of the member 117 also moves the lower bridging contact member 121 from the normally open to at closed position. Upon release of the depressed operating member 117, the operating spring 137 will move the operating member 117 back up to the position seen in FIG. 11 wherein the upper bridging contact member 119 is in the upper normally closed position and the lower bridging contact member 121 is in the lower normally open position. It is to be understood that these contacts can also be mounted to provide two normally open sets or two normally closed sets of contacts in a manner well known in the art.

Figure 12:
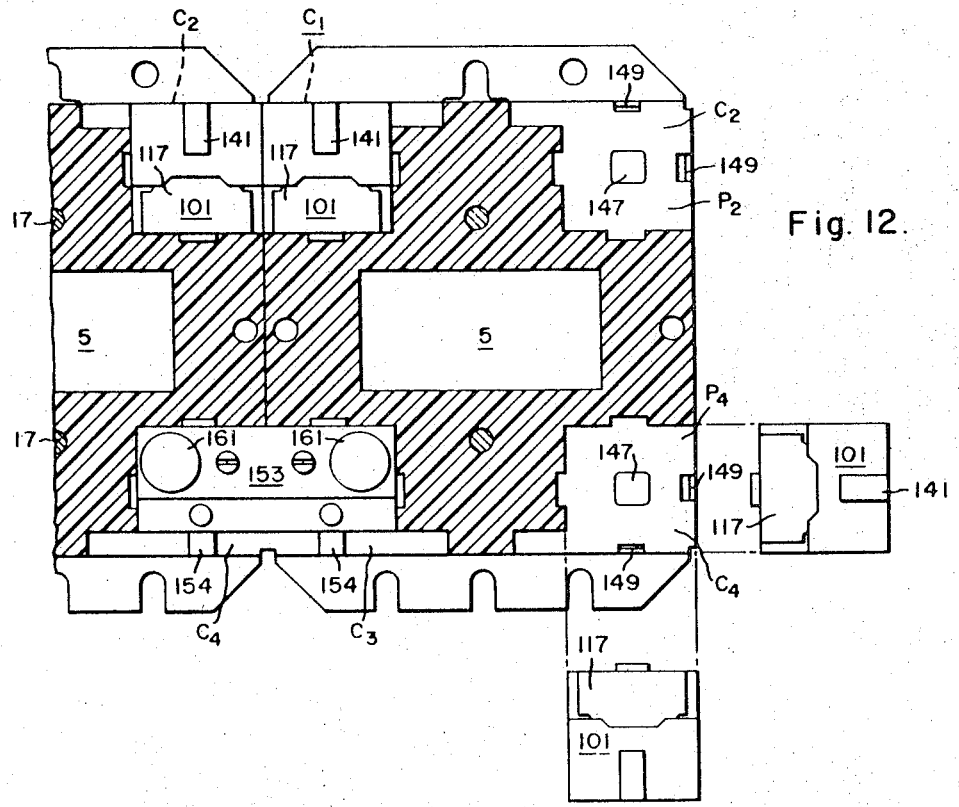
FIG. 12 is a sectional view taken generally along the line XII—XII of FIG. 8 of two identical control devices, of the type herein described, mounted in a substantially abutting side-by-side relationship with four auxiliary contact devices and a mechanical interlock shown in plan view in this figure.
Figure 6:
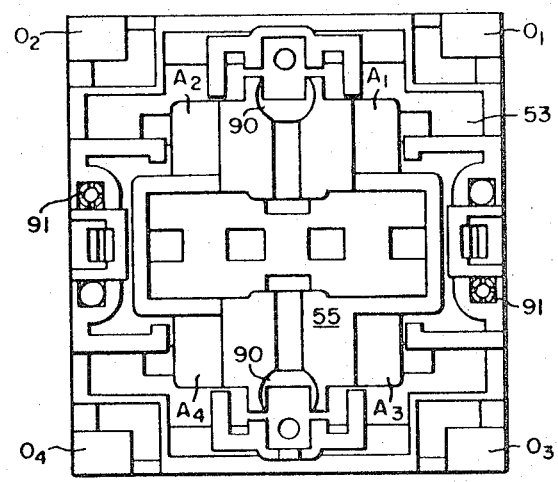
FIG. 6 is a bottom plan view of the front part (the part seen in FIG. 2A) of the control device of FIG. 1.
Figure 14:
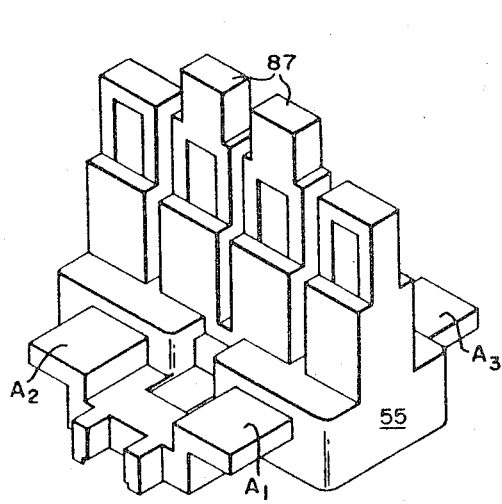
FIG. 14 is an isometric view of the insulating contact carrier seen in FIGS. 2A and 7.

Referring to FIG. 1, it will be noted that the insulating housing part 19, the insulating cover 39 of the coil structure 23 and the insulating housing part 53 mate and cooperate along with the insulating arc-hood device 59 to form the insulating housing structure of the contactor structure 9. The insulating parts 19, 39 and 53 are formed to provide four cavities, one at each of the back four corners of the contactor structure. The cavities are identified as $C_1$, $C_2$, $C_3$ and $C_4$. The cavity $C_4$, which cannot be seen in FIG. 1, is seen in FIG. 12. Each of the four cavities is either identical or symmetrically identical to each of the three other of the four cavities. The insulating housing part 53 overhangs the four cavities $C_1$, $C_2$, $C_3$ and $C_4$ at the four corners $O_1$, $O_2$, $O_3$ and $O_4$ thereof (FIGS. 1 and 6) respectively. The four corners $P_1$, $P_2$, $P_3$ and $P_4$ (FIGS. 1, 2B and 12) of the mounting plate 7 serve as the four bases of the cavities $C_1$, $C_2$, $C_3$ and $C_4$ respectively. The mounting plate, at each of the four corners thereof, is formed with a depression 147 stamped therein, and two openings 149 that are provided one at each of the two opposite edges of each corner. Referring to FIG. 12, there is shown therein, in section, one of the control devices 5 and part of another of the control devices 5, which devices are mounted in a substantially abutting side-by-side relationship. As can be seen in FIG. 12, the contactor 5 (on the right) is provided with an electric interlock 101 in the cavity $C_1$, an open cavity at $C_2$, one-half of a mechanical interlock indicated generally at 153 in the cavity $C_3$ and an open cavity $C_4$. Two auxiliary contact devices 101 are disposed outside of the cavity $C_4$ and dot-and-dash lines are drawn into the cavity $C_4$ in order to indicate that either of these electrical control devices could be mounted in the cavity $C_4$ by means of a rectilinear movement into the mounted position. Thus, it is to be noted that an electrical interlock can be mounted in any of the four cavities of the contactor in either of the two positions indicated at the cavity $C_4$ in FIG. 12. When one of the auxiliary contact devices 101 is moved into the mounted position in the associated cavity, the lower spring clip 139 (FIGS. 9–11) passes through the associated opening 149 and the clip is additionally spring charged when the end part thereof engages the lower depression 147 to provide increased frictional support. The upper spring 141 engages in an associated notch 155 (FIGS. 1 and 6) and is spring charged against the overhang in the notch 155 to provide spring pressure whereby the springs 139, 141 of the auxiliary contact device maintain the contact device 101 in the mounted position in the cavity. Referring to FIG. 6, it will be noted that the insulating contact carrier 55 is provided with four corners $A_1$, $A_2$, $A_3$ and $A_4$ molded as integral parts of the contact carrier. Each of the corners $A_1$, $A_2$, $A_3$ and $A_4$ serves as an actuating part moving in the associated cavity rectilinearly in a vertical (FIGS. 7 and 8) direction with the insulating contact carrier to thereby engage and actuate the operating member 117 of an auxiliary contact device if the auxiliary contact device is disposed in the cavity. The auxiliary contact 101 will be actuated by the associated actuating part of the contact carrier 55 in either of the two possible mounted positions (see $C_4$ of FIG. 12). It will be noted that the operating member 117 of the auxiliary contact device is wide enough so that it will be disposed in the inside corner portion of the cavity just under the actuating part of the contact carrier regardless of the direction of mounting (see $C_4$ of FIG. 12) of the rectifier contact device in the cavity. With the auxiliary contact device in position, the terminals 113 and 115 (FIG. 9) are accessible for connection of the associated contacts in an electric circuit. As can be seen in FIG. 12, when the auxiliary contact device 101 is mounted in the cavity (the auxiliary contact device being shown fully mounted in the cavity $C_1$) the contact device 101 does not extend past the length and width dimensions of the insulating housing parts 19, 39, 53 (FIG. 1) and, since the base plate 7 serves as the base of the cavity and because the insulating member 53 overhangs the associated cavity space, it can be understood that the auxiliary contact device is disposed such that it will not take up additional space in a panelboard or control center. The auxiliary contact device 101 is readily removably mounted in position by merely being moved into the mounted position with the spring clips 139, 141 serving to retain the auxiliary contact device in position. If desired, additional attaching means such as screws could be used to secure the auxiliary contact device in position. It is to be noted that the operating member 117 of the auxiliary contact device is automatically operatively connected to the contact carrier of the contactor merely by means of the mounting operation.

Figure 13:
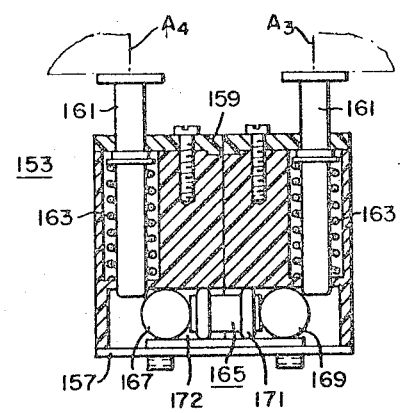
FIG. 13 is a side sectional view of the mechanical interlock seen in FIG. 12.

For certain applications, it is desirable to prevent simultaneous operation of two control devices that may be mounted in a side-by-side relationship. The mechanical interlock 153 (FIG. 13) is provided for this purpose. As can be seen in FIG. 13, the interlock 153 comprises a base member 157, an insulating housing structure 159, two operating members 161 supported for rectilinear vertical movement in the housing structure 159, two compression springs 163 supported to bias the operating members 161 to the upper position shown, and a blocking structure indicated generally at 165. The blocking structure 165 comprises two ball bearings 167 and 169 separated by means of a spacer 171. The blocking structure 165 reciprocates horizontally (FIG. 3) in a track 172. The blocking structure 165 interlocks the operating members 161 so that they cannot be simultaneously depressed. If one of the members 161 is depressed, the blocking structure 165 will be moved horizontally in the track 173 to engage the lower end of the other member 161 to prevent depression of the other member. The spacing of the blocking structure 165 is such that both of the members 161 if they are moved simultaneously will be blocked from movement by engagement thereof with the ball bearings 167 and 169. Thus, the interlock 153 provides that the operating member 161 cannot be moved to the lower operating positions at the same time. The details and operation of the interlock 153 are more specifically described in the copending application of John P. Conner et al., Ser. No. 367,716, filed May 25, 1964, now Patent No. 3,312,122, assigned to the assignee of the instant application.

Referring to FIG. 12, it will be noted that when the two control devices 5 are mounted in a substantially abutting side-by-side relationship, the adjacent cavities $C_3$ and $C_4$ of the two devices provide a common pocket into which the mechanical interlock 153 can be disposed. The interlock 153 may be removably secured to the mounted position by means of spring clips 154 (similar to the clips 139 of FIGS. 9–11). As can be seen in FIG. 12, the mechanical interlock 153 is disposed within the confines of the associated pocket that comprises the adjacent cavities $C_3$, $C_4$ so that the interlock does not take up additional panelboard space. It is to be understood that a mechanical interlock 153 could also be similarly mounted in the upper adjacent cavities $C_1$, $C_2$. It is noted in FIG. 12, that the two operating members 161 are disposed at the inside corners of the associated cavities $C_3$, $C_4$ so that each of the members 161 would be disposed under the associated actuating part $A_3$ or $A_4$ of the insulating contact carrier. Thus, with the members 161 disposed under the contact carriers of the adjacent contactors, the blocking structure 165 (FIG. 13) will operate to interlock the contact carriers, in the same manner hereinbefore described, to prevent the contactors from being operated to the actuating position at the same time. It is also to be noted that the operating members 161 are automatically operatively connected to the insulating contact carriers of the adjacent contactors merely by means of the mounting operation of the mechanical interlock.

From the foregoing, it will be understood that there is provided by this invention an improved combination of two similar contactors mounted in a side-by-side relationship with a mechanical interlock disposed in a common pocket formed by means of two adjacent cavities. The mechanical interlock serves to limit the contactors to alternate operation. The mechanical interlock can be mounted at each of two opposite sides of the mounted contactors in either of two pockets formed by adjacent cavities of the contactors. The contactors are so constructed that the mechanical interlock fits within the confines of the associated pocket so that the combination does not require additional panelboard space. The mechanical interlock is automatically operatively connected to the contactors merely by means of the mounting operation.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In combination:
   two electric control devices and a mechanical interlock device,
   each of said electric control devices comprising: an insulating housing, a control mechanism supported generally within said insulating housing, said control mechanism comprising a pair of contacts, an electromagnet and a movable member, said pair of contacts being operable between opened and closed operating positions, said electromagnet being operable between an energized and a deenergized condition, upon operation of said electromagnet from one to the other of said conditions said movable member moving to operate said contacts from one to the other of said operating positions, said insulating housing being shaped to form a cavity.
   means mounting said two control devices in a side-by-side relationship with said cavities being adjacent each other to form a common pocket,
   said mechanical interlock comprising two operating members, each of said operating members being movable from an unactuated position to an actuated position, blocking means operating automatically to prevent said operating members from being in the actuated position at the same time,
   means mounting said mechanical interlock in said common pocket with each of said operating members being positioned in the path of movement of a different one of said two movable members to limit operation of said two electric control devices to alternate operation.

2. A combination according to claim 1, said two electric control devices having a length, a width and a height, and said movable members of said two electric control devices and said operating members of said mechanical interlock moving substantially within the confines of said length, width and height.

3. A combination according to claim 1, said insulating housings of said two electric control devices comprising a first insulating housing and a second insulating housing, said mechanical interlock comprising a third housing and two operating members extending from said third housing, said blocking means being disposed within said third housing and said operating members extending from said third housing, said two control devices having a length, a width and a height, said movable members of said control devices and said operating members of said mechanical interlock device moving substantially within the confines of said length, width and height.

4. A combination according to claim 3, and said mechanical interlock device being disposed substantially within the confines of said length, width and height.

5. A combination according to claim 1, a mounting plate for each of said electric control devices, each of said mounting plates having a generally planar front, each of said insulating housings being mounted on the front of the associated mounting plate, in each of said electric control devices the movable member being supported for rectilinear movement toward and away from the associated mounting plate normal to the plane of the generally planar front of the associated mounting plate, and each of said operating members being positioned between the associated movable member and the associated mounting plate in the path of movement of the associated movable member whereby said operating members limit operation of said two electric control devices to alternate operation.

6. A combination according to claim 5, said two insulating housings having a length, a width and a height, and said movable members of said electric control devices and said operating members of said mechanical interlock moving substantially within the confines of said length, width and height.

7. A combination according to claim 5, each of said movable members comprising an insulating contact carrier carrying one of the contacts of the associated pair of contacts.

8. The combination according to claim 5, said mechanical interlock comprising a third housing, said blocking means being disposed within said third housing and said operating members extending from said third housing, said two insulating housings having a length, a width and a height, said movable members of said control devices and said operating members of said mechanical interlock device moving substantially within the confines of said length, width and height.

9. The combination according to claim 8, said mechanical interlock being disposed substantially within the confines of said length, width and height, and each of said movable members comprising an insulating contact carrier carrying one of the contacts of the associated pair of contacts.

References Cited

UNITED STATES PATENTS

| | | | |
|---|---|---|---|
| 2,755,354 | 7/1956 | Dehn et al. | 335—120 |
| 3,098,909 | 7/1963 | Scheib | 335—120 |
| 3,324,431 | 6/1967 | Cataldo et al. | 335—132 |

BERNARD A. GILHEANY, *Primary Examiner.*

H. BROOME, *Assistant Examiner.*